United States Patent [19]

Jang

[11] Patent Number: 5,278,664
[45] Date of Patent: Jan. 11, 1994

[54] METHOD FOR INCREASING COMMUNICATION EFFICIENCY IN A MULTIPORT FACSIMILE

[76] Inventor: Gi-Su Jang, Seoul, Rep. of Korea

[21] Appl. No.: 632,943

[22] Filed: Dec. 24, 1990

[30] Foreign Application Priority Data

May 23, 1990 [KR] Rep. of Korea .................. 1990-7453

[51] Int. Cl.⁵ ........................ H04N 1/40; H04N 1/00
[52] U.S. Cl. .................................. 358/440; 358/444; 358/438; 358/434; 358/403; 358/404
[58] Field of Search ............... 358/440, 402, 403, 407, 358/444, 437, 442, 468, 400, 404, 438

[56] References Cited

U.S. PATENT DOCUMENTS

| | | | |
|---|---|---|---|
| 4,901,341 | 2/1990 | Carter et al. | 379/89 |
| 4,922,348 | 3/1990 | Gillon et al. | 358/442 |
| 4,994,926 | 2/1991 | Gordon et al. | 358/440 |
| 5,077,787 | 12/1991 | Masatomo | 358/440 |
| 5,095,373 | 3/1992 | Hisano | 358/403 |

*Primary Examiner*—Edward L. Coles, Sr.
*Assistant Examiner*—Fan Lee

[57] ABSTRACT

A method for transmitting message of a document in a multiport facsimile, in which the messages to be transmitted are registered in a memory unit in file unit together with a specific message-registration table; and all the registered messages having the same destination are re-registered in a specific transmission-result table for subsequent transmission to the destination in one dial-up.

11 Claims, 6 Drawing Sheets

FIG. 5

| | 10 | |
|---|---|---|
| [0] | 0001 | |
| | FFFF | |
| | .... | | c ~ (top), a ~ (bottom left), d ~ (bottom right)

| | 11 | |
|---|---|---|
| [0] | 0001 | |
| [2] | 0003 | |
| [3] | 0004 | |
| | FFFF | |
| | ... | |

| | 12 | |
|---|---|---|
| [0] | 0001 | |
| [1] | 0002 | |
| [2] | 0003 | |
| | FFFF | |
| | ... | |

| | 13 | |
|---|---|---|
| [0] | 0001 | |
| [1] | 0002 | |
| [2] | 0003 | |
| | FFFF | |
| | ... | |

| | 14 | |
|---|---|---|
| [0] | 0001 | |
| [3] | 0004 | |
| [2] | FFFF | |
| | .... | |

– 1 –

METHOD FOR INCREASING COMMUNICATION EFFICIENCY IN A MULTIPORT FACSIMILE

BACKGROUND OF THE INVENTION

The present invention relates to a method for transmitting a message of a document in a multiport facsimile having more than one communication channel as well as memory unit transmitting features, and more particularly to a method for collecting and storing input messages in their registration order and transmitting messages having a same destination on a single call.

In a multiport facsimile, to be sent are generally stored in a memory unit after they are placed and scanned by the scanner. The messages are dispatched on one-to-one basis to a destination that has been registered whenever possible. However, a drawback in such multiport facsimile is that, when there are a plurality of messages to be dispatched, messages have to be dispatched on a one-to-one basis to the same destination and not simultaneously in one call.

SUMMARY OF THE INVENTION

It is therefore an object of the present invention to store messages to be dispatched to multiple destinations in a memory unit by a message transmission method that can dispatch, in one call, messages having the same destination but not supplemented with relay or mailbox features.

According to an aspect of the present invention, a method for transmitting a message of a document in a multiport facsimile, in which the messages to be transmitted are registered in a memory units in file unit together with a specific message-registration table and the registered messages having the same destination are re-registered in a specific transmission-result, table according to the destination and transmitted to the same destination in one dial-up.

According to another aspect of the present invention, a method for increasing communication efficiency in a multiport facsimile having a plurality of line interface units LIU's for controlling a plurality of communication channels and transmitting messages after storing, in a memory unit, messages of a plurality of documents, the method including the steps of:

(a) checking for a number of the transmissible LIU's, and initializing the index counter allocated in the memory unit and indicative of a message-registration table index registered along with said message;

(b) checking for, after executing step (a), a message to be transmitted from the message-registration table indicated by the index counter;

(c) after executing step (b), when there is no message to be transmitted in the message-registration table index indicated by the index counter, increasing the index counter by 1, comparing the increased value to a maximum-index value, and if the two values are the same, finishing the process, and if they are not the same, returning to step (b);

(d) after executing step (b), when there is a message to be transmitted in the message-registration table index indicated by the index counter, loading a relative-number and a file-number from the indicated message-registration table, saving them to a transmission-result table which has been allocated and defined in a given area of the memory unit, assigning the value of said index counter to the variable K which also has been allocated and defined in a given area of the memory unit, and increasing the variable K by 1;

(e) after executing step (d), checking for a message to be transmitted in the message-registration table index indicated by the variable K;

(f) after executing step (e), when there is no message to be transmitted in the message-registration table index in step (e), increasing the variable K by 1, comparing the increased index counter value to the maximum-index value, and returning to step (e) if the compared values are not the same;

(g) after executing step (e), when there is a message to be transmitted in the message-registration table index indicated by the variable K, checking for a matching relative-number of a transmission-result table within the message-registration table, and when there is a match, registering the file-number to transmission-file-number field of the transmission-result table, returning to step (f), and when there is no match, directly returning to step (f); and (h) after executing step (f), when the value of the variable K is the same as the maximum-index value, the main controller decreases by 1 an LIU counter which is allocated and defined in the memory unit, and then the main controller checks whether the decreased value is 0 or not, and if the value is 0, terminates the execution, or returns to step (b) if the value is not 0.

BRIEF DESCRIPTION OF THE DRAWINGS

For a better understanding of the invention and to show how the same may be carried into effect, reference will now be made, by way of example, to the accompanying diagrammatic drawings, in which:

FIG. 4 and FIG. 5 are embodiments of the present invention.

DETAILED DESCRIPTION OF THE PREFERRED EMBODIMENTS

Figure 1:
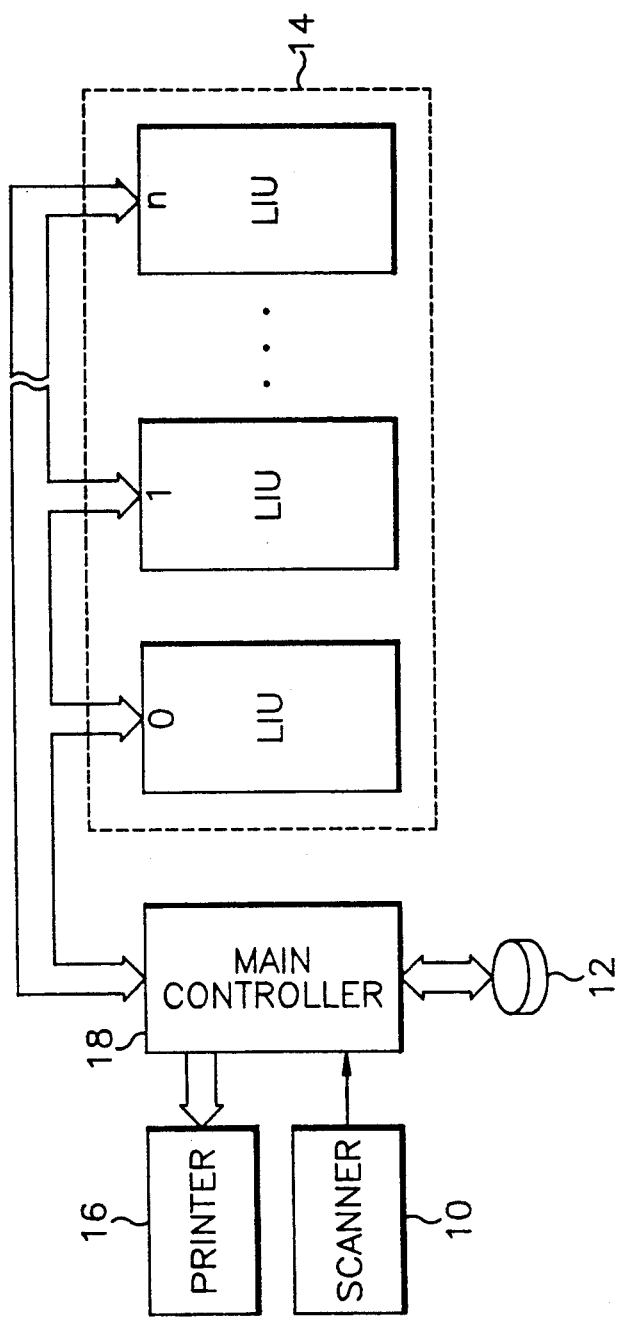
FIG. 1 is a system block diagram according to the invention.

Referring to FIG. 1, a main controller 18 controls a plurality of features required for message transmission and reception. A scanner 10 sends to the main controller 18 after it scans input message under control of the main controller 18. A memory unit 12 stores and retrieves data under control of the main controller 18. A line interface 14 interfaces data input/output to a plurality of multiple communication lines under control of the main controller 18. A printer 16 prints data output from the main controller under control of main the controller 18.

Figure 2A:
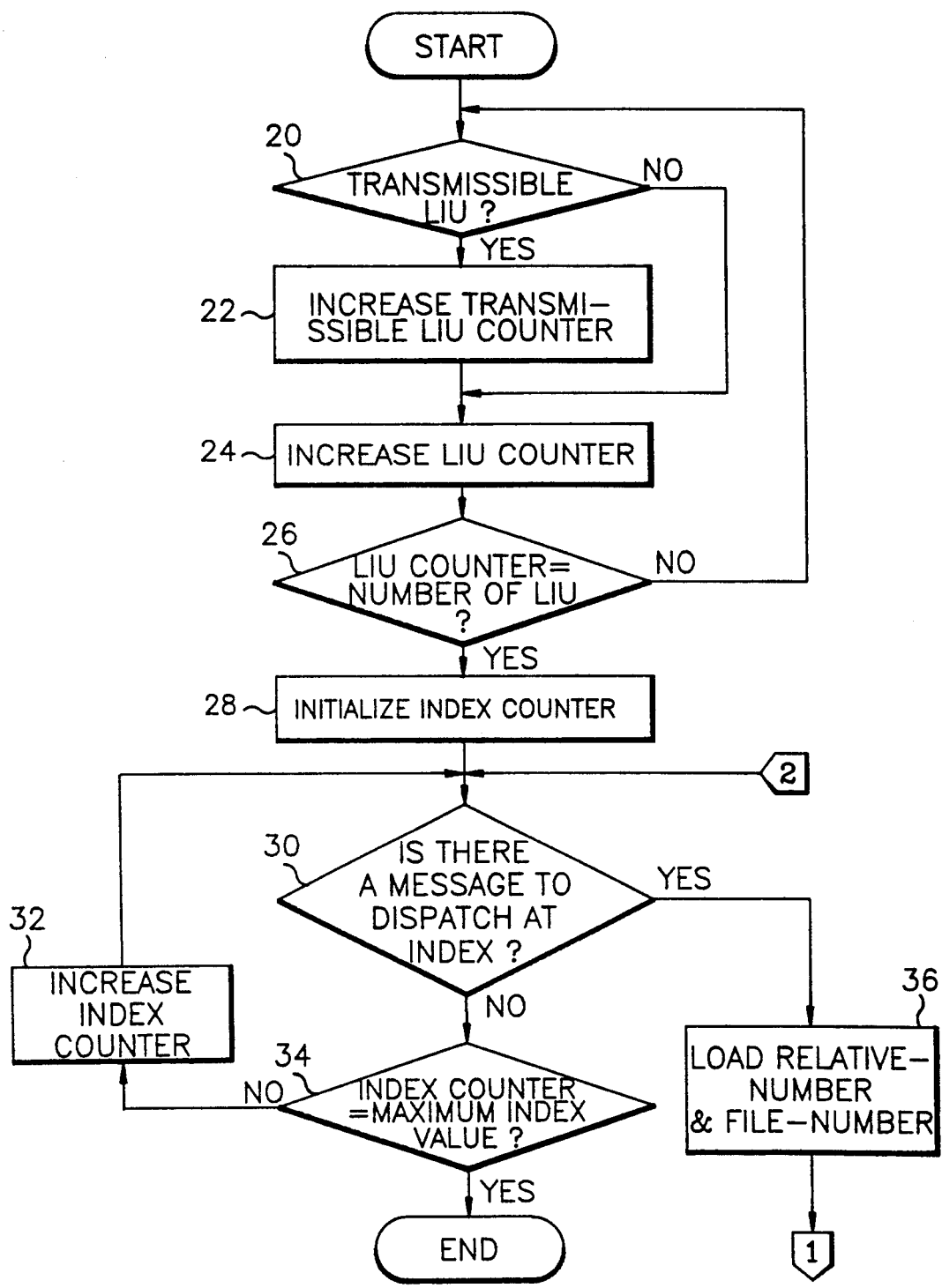
FIGS. 2A and 2B is a flow diagram according to the invention.
Figure 2B:
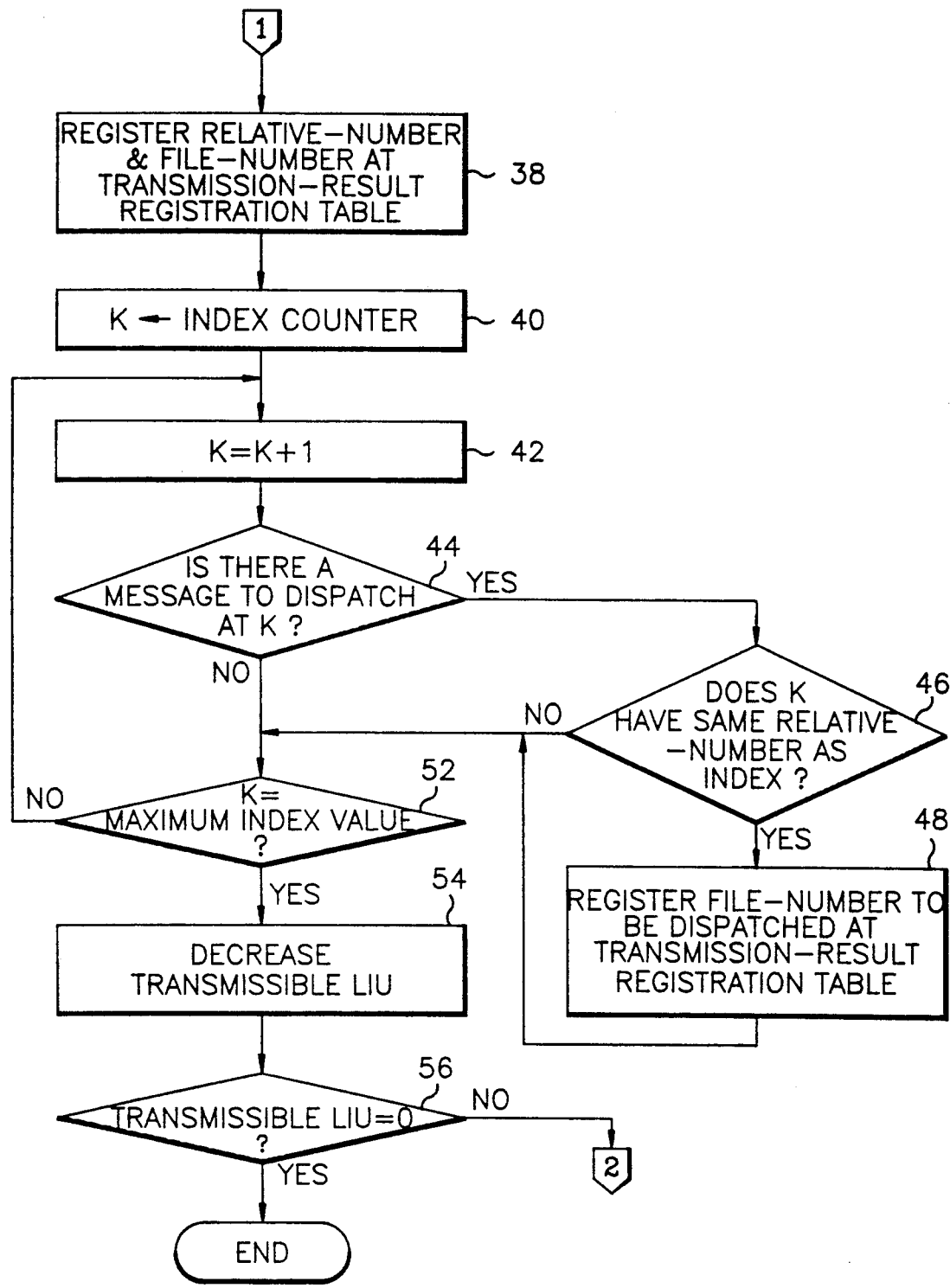

Referring to FIG. 2, in step (a), the main controller 18 checks a number of communication-possible LIU (Line Interface Unit) and initializes the index counter representing a message-registration table index. In step (b), the main controller 18 checks a message-registration table for messages to be dispatched by inspecting the index counter after execution of the step (a). In step (c), after executing the step (b), if there is no message to be dispatched message-registration table in the index indicated by the index counter, the main controller 18 increments the index counter by 1 and then checks whether a value of the incremented index counter is the same as a maximum index value, and if the values are the same, stopping the flow, and if not, returning to step (b). In the step (d), if there is a message to be dispatched; the main controller 18 loads and saves a relative-number and a file-number of the message-registration table to a transmit-result record table, and assigns the value of the index counter to a variable K and increases the variable K by 1. In step (e), after completing step (d), the main controller 18 checks whether there is a message to be dispatched within the content of the message-registration table pointed by the variable K. In step (f), after completing step (e), the main controller 18 increases the variable K by 1 and then checks whether the incremented index counter is the same as the maximum index value; upon completion of step (e), if there is no message to be dispatched in the message-registration table, and if the values are not the same, returning to step (e). In step (g), after completing step (e), if there is a message to be dispatched in the message-registration table index that matches the variable K, the main controller 18 checks whether there is a relative number matching with a value in a relative number column of a dispatch-result record table in the message-registration table, and if there is a matching relative number, proceeding to step (f) after recording a file number in a sending-file number column of the dispatch-result record table, and if there is no matching relative number, proceeding directly to step (f). In step (h), after completing step (e), if the variable K is the same as the maximum-index value, the main controller 18 decreases the call-possible LIU-Counter value by 1 and checks for value zero, and if it is zero, then concludes the flow, else, returns the flow to the step (b).

Figures 3A, 3B:
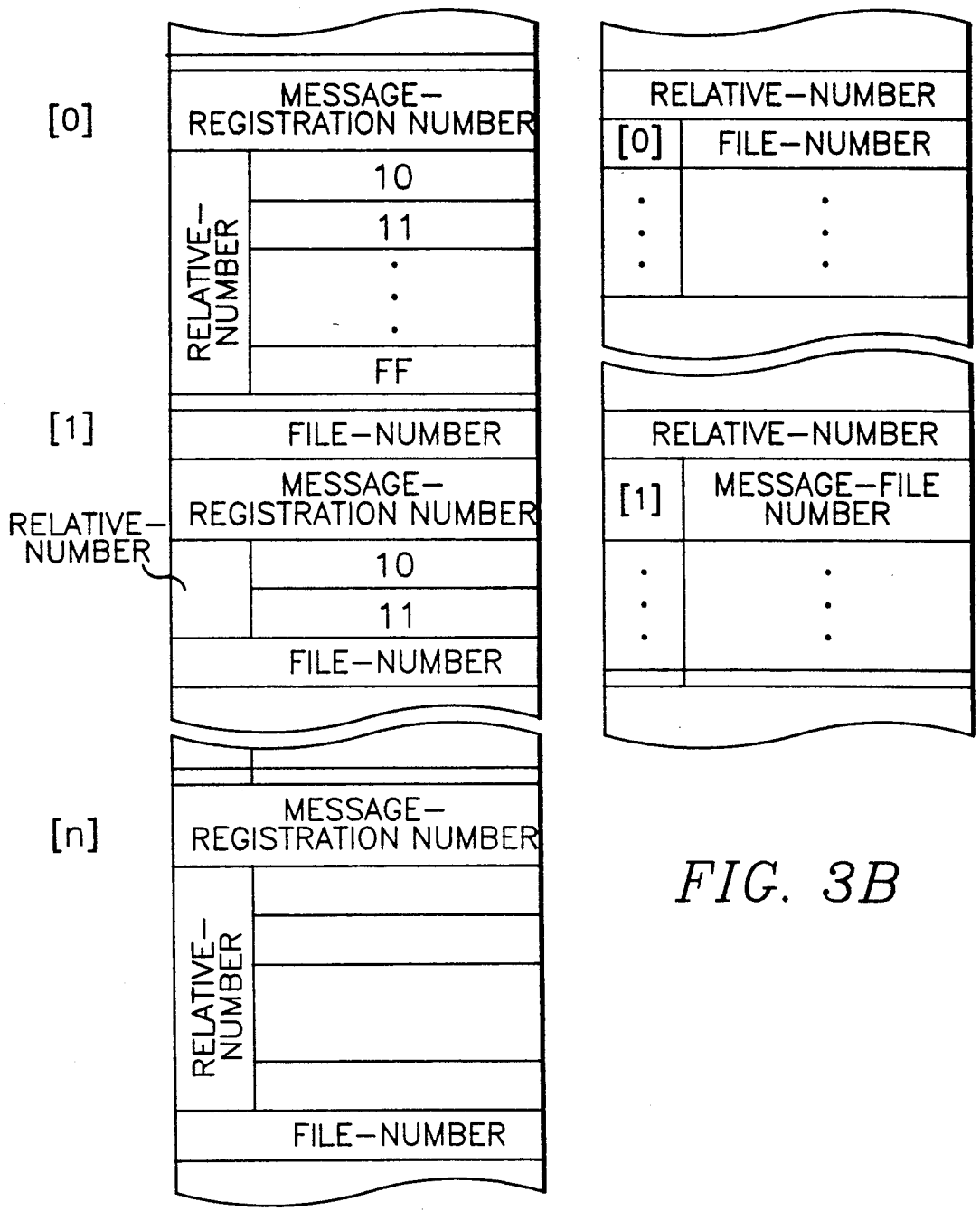
FIGS. 3A and 3B is a memory unit map diagram according to the invention.

FIG. 3 is a memory unit map 12 required to execute the present invention. Diagram A represents message-registration tables in which message files are registered in their registration order. Diagram B shows the contents of the message-registration tables arranged according to relative-number, representing transmission-result tables which are updated whenever a message is dispatched.

Figure 4:
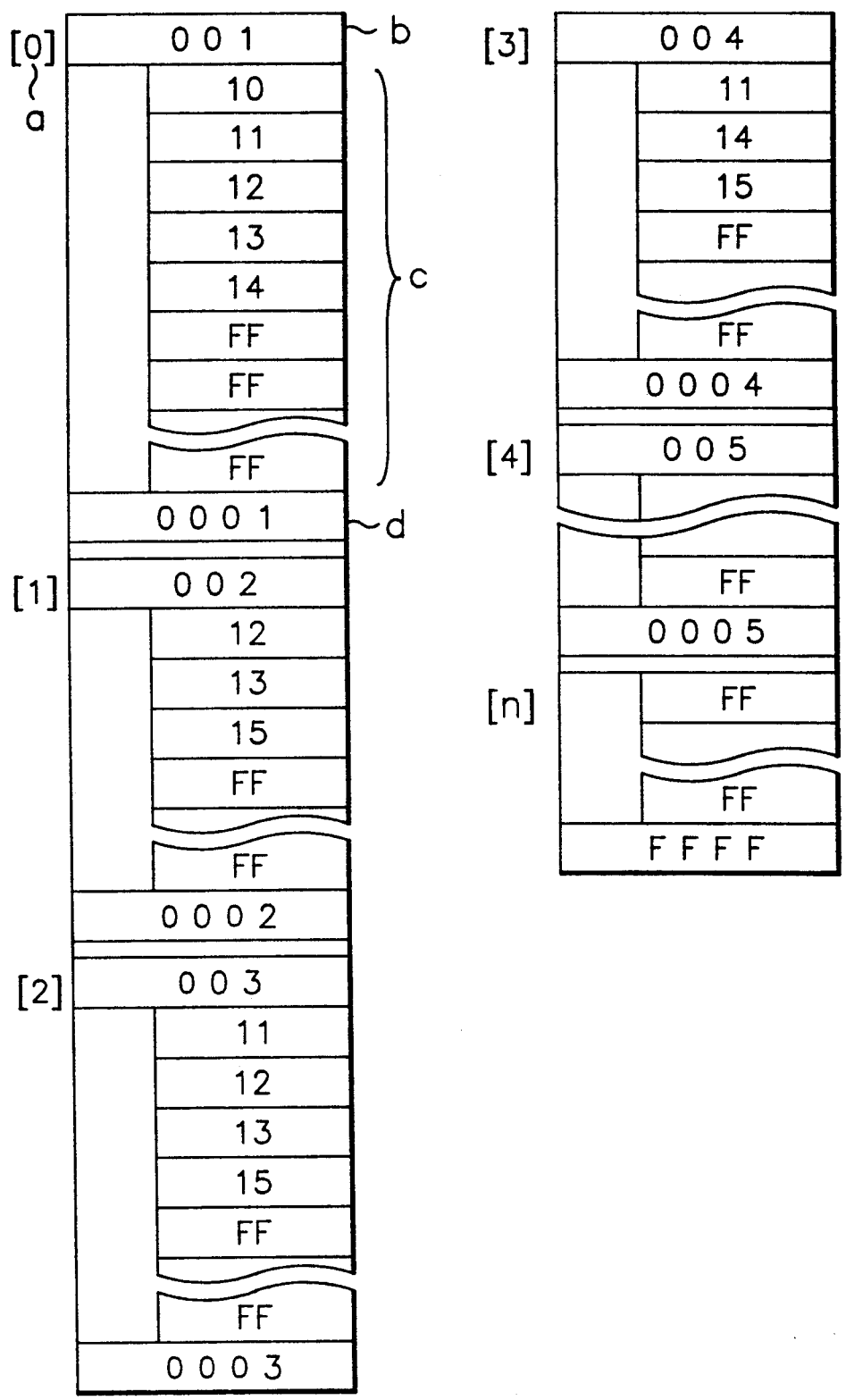

FIG. 4 and FIG. 5 are change diagrams according to an embodiment of the invention in which: index is represented by (a), message-registration number is represented by (b), destination number of message (b) is represented by (c), and file number is represented by (d).

First, when a document is placed into the facsimile for transmission, the scanner 10 scans the document and the main controller 18 generates a table (described in the diagram A of FIG. 3) and loads the scanned message with the table to the memory unit 12 in file units. From this state, the execution of the present invention begins. For example, it is assumed that line the interface 14 of FIG. 1 has 8 LIU's and the document is registered in the memory unit 12 as in FIG. 4. In a step 20 of FIG. 2A, the main controller 18 checks whether there call-possible LIU's and if it is possible, in step 22, a given memory unit area is allocated and a LIU counter (representing a number of transmissible LIU) is incremented by 1. Also in step 24, a given memory unit area is allocated and the LIU counter is incremented by 1. In step 20, if the transmission to a LIU is not possible, the main controller 18 skips step 20 and executes step 24 is directly. In step 26, the main controller 18 compares the value of the LIU counter with a number of LIU's in the system and if it is the same, the transmissible LIU counter value is read, and then in step 28, the index counter that counts index marked on each file when the document is registered in the memory unit 12, is initialized to search from the initial part of message of the registered document. This index counter is also represented within the memory unit 12. In step 30, the main controller 18 determines whether there is a message to be dispatched by checking whether a first message-registration number in the index file indicated by the index counter is set as FF. If the first message-registration number is set as FF, the main controller 18 estimates that there is no message to be dispatched, and if not, then the main controller 18 estimates that there is a message to be dispatched.

When the main controller 18 estimates that there is no message to be dispatched in step 30, the main controller 18 accomplishes step 32, therefore the index counter is incremented by 1. And in step 34, a value of the index counter is compared with maximum-index value. The main controller 18 stops the execution if two values are the same, else the main controller 18 returns from step 34 to step 30 to check whether there are more to be dispatched.

In step 36, when there is a message to be dispatched in the message-registration table of index indicated by the index counter in step 30, the relative-number and the file-number from the message-registration table are loaded and then in step 38, they are registered to the transmission-result registration table.

The index counter serves as a search-index of the message-registration table (FIG. 3) and the index counter determines one relative-number for one LIU. A variable K is used to find a pre-assigned relative-number.

In step 40, the main controller 18 registers the value of the index counter to the variable K. In step 42, the main controller 18 increases the variable K by 1. Before incrementing the variable K, the index counter and the variable K have the same value of 0, and already completed a search for the message-registration table with the index value of 0, so it is necessary to increase the value of the variable K in order to begin a next search at the relative-number having an index value of 1.

In step 44, the main controller 18 checks whether there is a message to be transmitted of the message-registration table indexed by the variable K. If there is a message to be transmitted in step 46, the main controller 18 compares the relative-numbers of the content of message-registration table indexed by the variable K with the relative-number selected in step 36. If they have the same value, the file-number is registered to a transmission-result table and proceeds to step 50. However, the main controller 18 accomplishes step 50, if there is no message to be transmitted at step 44 or the relative-numbers obtained in step 36 and that the variable K of step 46 are different.

In step 52, the values of the variable K and the maximum-index are compared to determine whether further checking is required. If the value of the variable K is less than that of maximum-index, further search is required, thus execution returns to step 42, and step 42 to step 52 are repeated again. Else, if the value of variable K and the value of maximum-index are identical, the value of the transmissible LIU counter (increased at step 42) is decreased. At step 56, the main controller 18 checks whether the value of the LIU counter is 0. If the value is not 0, the main controller 18 returns the execution to the step 30, therefore the step 30 through 56 are repeated until the value of LIU counter reaches to 0.

When the value of the LIU counter reaches 0, the execution terminates.

FIG. 5 shows the content of the transmission-result table following the foregoing operation.

The present invention has an advantage that, by accommodating multiport and memory-transmission function, can reduce overall communication time by dispatching messages having the same destination in one dial-up, thereby eliminates multiple dial process and initial control protocol to be found on a one-to-one basis communication.

While the invention has been particularly shown and described with reference to a preferred embodiment, it will be understood by those skilled in the art that modifications in detail may be made without departing from the spirit and scope of the invention.

What is claimed is:

1. A method for increasing communication efficiency in a multiport facsimile having a memory and line interface units for controlling communication channels and enabling transmission of messages stored in said memory, said method comprising:

registering messages of a plurality of documents in a plurality of files, said plurality of files being organized in a message-registration table allocated in said memory;

re-registering the registered messages from said plurality of files having the same destination in a transmission-result table allocated in said memory by:

checking for a number of line interface units for enabling transmission of messages via communication lines, and initializing an index counter allocated in said memory for counting index of each file within said message-registration table after registration of said messages in said plurality of files;

searching for messages to be transmitted from the index of each file within said message-registration table indicated by said index counter for each increment of said index counter until the incremented value of said index counter reaches a maximum index value; and re-registering messages to be transmitted to the same destination from the index of said message-registration table onto said transmission-result table; and transmitting the re-registered messages having the same destination from said transmission-result table to said same destination in a single dial.

2. The method as claimed in claim 1, wherein said message-registration table comprises an index number and a message-registration number, multiple destination-numbers and file-numbers.

3. The method as claimed in claim 1, wherein said transmission-result table comprises a relative-number, an index number, and a file-number.

4. A method for increasing communication efficiency in a multiport facsimile having a plurality of line interface units for controlling a plurality of communication channels and transmitting messages after storing in a memory messages of a plurality of documents, said method comprising the steps of:

checking for a number of line interface units, and initializing an index counter allocated in said memory and indicative of an index of a message-registration table registered along with the messages;

searching for messages to be transmitted from the index of said message-registration table indicated by the index counter;

incrementing the index counter by one, and comparing the incremented value of said index counter with a maximum-index value if there are no messages to be transmitted from the index of said message-registration table indicated by said index counter, and if the incremented value and maximum-index value are the same, terminating the processing steps, and if the incremented value and the maximum-index value are not the same, returning to the step of searching for messages to be transmitted from the index of said message-registration table indicated by said index counter;

loading a relative-number and a file-number from said message-registration table, saving the relative-number and the file number in a transmission-result table allocated in said memory, assigning the value of said index counter to a variable K, and increasing said variable K by one if there are messages to be transmitted from the index of said message-registration table indicated by said index counter;

searching for messages to be transmitted from the index of said message-registration table indicated by the variable K;

increasing the variable K by one, and comparing the increased index counter value to the maximum-index value if there are no messages to be transmitted from the index of said message-registration table indicated by said index counter, and returning to the step of searching for messages to be transmitted from the index of said message-registration table indicated by the variable K if the compared values are not the same;

searching for a matching relative-number of a transmission-result table within said message-registration table if there are messages to be transmitted from the index of said message-registration table indicated by said index counter;

registering the file-number in a transmission-file-number of the transmission-result table if there is a matching relative-number from said transmission-result table, and then returning to the step of increasing the variable K by one and comparing the increased index counter value with the maximum-index value;

directly returning to said step of increasing the variable K by one and comparing the increased index counter value with the maximum-index value if there is no matching relative-number rom said transmission-result table; and decreasing a line interface unit counter allocated in said memory by one for making a determination of whether the decreased value of said line interface unit counter is zero, returning to the step of searching for messages to be transmitted from the index of said message-registration table if the decreased value is not zero, and terminating the processing steps if the decreased value is zero.

5. The method as claimed in claim 4, wherein the step of checking for a number of line interface units comprises:

checking whether an line interface unit is transmissible;

if said line interface unit is transmissible, increasing the line interface unit counter by one;

comparing the value of said line interface unit counter to a total number of line interface units; and if the compared values are not the same, returning to the step of checking whether the line interface unit is transmissible.

6. A process for transmitting files in a multiport device, comprising the steps of:

arranging a plurality of files in a plurality of message-registration tables, each representing a different file and a set of destination for each of said files;

registering a plurality of files into one or more transmission-result tables, each of said transmission-result tables representing a different destination of a plurality of destinations and a corresponding set of one or more files to be sent to said destination, said plurality of files being registered by the steps of:

indexing the first of said plurality of message-registration tables;

indexing the first of the set of destinations represented by the currently indexed message-registration table;

creating a transmission-result table comprising the currently indexed destination and the files represented by the currently indexed message-registration table;

registering into said transmission-result table the files corresponding to the ones of said plurality of message-registration tables comprising said currently indexed destination;

indexing the next of the set of destinations represented by the currently indexed message-registration table;

returning to the step of creating said transmission-result table if the currently indexed destination is not registered in said transmission-result table, and other wise returning to the step of indexing the next of the set of destinations; and indexing the next of said plurality of message-registration tables and returning to the step of indexing the first of the set of destinations until all of said plurality of message-registration tables have been indexed; and transmitting said one or more files according to said transmission-result tables, with all files being indicated by a corresponding one of said transmission-result tables being transmitted to the corresponding destination during a single transmission.

7. The process of claim 6, wherein said message-registration tables and said transmission-result tables are allocated in said memory.

8. The process of claim 6, further comprised of determining the number of line interface units available for transmission of said plurality of files.

9. The process of claim 8, further comprised of terminating said step of registering said plurality of files when the number of transmission-result tables equals the number of line interface units.

10. The device for transmitting files in a multiport device, comprising:

memory means for storing and retrieving a plurality of files, a plurality of message-registration tables and one or more transmission-result tables;

means for enabling registration of said plurality of files onto said message-registration tables and said transmission-result tables by;

indexing the first of said plurality of message-registration tables;

indexing the first of the set of destinations represented by the currently indexed message-registration table;

creating a transmission-result table comprising the currently indexed destination and the files represented by the currently indexed message-registration table;

registering into said transmission-result table the files corresponding to the first of said plurality of message-registration tables comprising said currently indexed destination;

indexing the next of the set of destinations represented by the currently indexed message-registration table;

returning to the step of creating said transmission-result table if the currently indexed destination is not registered in said transmission-result table, and otherwise returning to the step of indexing the next of the set of destinations; and indexing the next of said plurality of message-registration tables and returning to the step of indexing the first of the set of destinations until all of said plurality of message-registration tables have been indexed; and control means for generating transmission-result tables based on said plurality of message-registration tables and for controlling the transmission of said plurality of files according to said transmission-result tables; and line interface means for transmitting said plurality of files under control of said control means.

11. The device of claim 10, wherein said line interface means comprises a plurality of line interface units each controlling transmission of each of said plurality of files through a different one of a plurality of communication lines.

* * * * *

UNITED STATES PATENT AND TRADEMARK OFFICE
CERTIFICATE OF CORRECTION

PATENT NO.  : 5,278,664
DATED       : January 11, 1994
INVENTOR(S) : Gi-Su Jang

It is certified that error appears in the above-indentified patent and that said Letters Patent is hereby corrected as shown below:

On the title page: Item [73] Assignee: SamSung Electronics Co., Ltd, Suwon, Rep. of Korea --.

Item [56] insert -- Attorney, Agent,or Firm --Robert E. Bushnell --.

Column 1, line 13, insert --messages -- before "to be sent"
          line 16, insert --a-- before "one-to-one"

Line 33,    change "units" (first occurance) to --unit--, and change unit (second occurance) to --units--;

Line 36,    delete a comma "," after "transmission-result";

Line 51,    insert --index-- before " table";

Column 2

Line 56,    change "main the controller" to --the main controller--;

Line 66,    insert --in the-- after "dispatched", and delete "in the" after "table";

UNITED STATES PATENT AND TRADEMARK OFFICE
CERTIFICATE OF CORRECTION

PATENT NO. : 5,278,664
DATED : January 11, 1994
INVENTOR(S) : Gi-Su Jang

It is certified that error appears in the above-indentified patent and that said Letters Patent is hereby corrected as shown below:

Column 3

Line 4, delete "the" (first occurance) before "step", and change ";" after "dispatched" to --,--;

Line 12 change "pointed" to --indicated--;

Line 54 delete "the" after "line";

Line 57, insert --are-- after "there";

Column 3

Line 64, delete "is" after number "24";

Column 4

Line 24 delete "of" after "table";

Line 59, insert --the-- before "maximum";

UNITED STATES PATENT AND TRADEMARK OFFICE
CERTIFICATE OF CORRECTION

PATENT NO. : 5,287,664

DATED : January 11, 1994

INVENTOR(S) : Gi-Su Jang

It is certified that error appears in the above-indentified patent and that said Letters Patent is hereby corrected as shown below:

```
Column 6, line 52, change "rom" to --from--;
Column 7, line 11, change "destination" to --destinations --;
          line 39, change "other wise" to --otherwise--.
Column 8, line 15, change ";" to --:--.
```

Signed and Sealed this

Twenty-sixth Day of July, 1994

*Attest:*

BRUCE LEHMAN

*Attesting Officer*     *Commissioner of Patents and Trademarks*